Patented Nov. 7, 1944

2,361,990

UNITED STATES PATENT OFFICE 2,361,990

VIBRATION ANALYZER

William J. Brown, West Englewood, N. J., assignor to Western Electric Company, Incorporated, New York, N. Y., a corporation of New York Application April 15, 1943, Serial No. 483,129

9 Claims. (Cl. 234—5.6)

This invention relates to an improvement in vibrations analyzers, particularly useful in the analysis of vibrations due to an agency such as an airplane engine which must be operated over a wide range of rotational speeds.

The conventional method of vibration analysis requires that the vibration producing agency continue unchanged in operation throughout any single test. For example, the Western Electric RA-281 analyzer furnishes a chart on which the abscissae represent frequencies and the ordinates the amplitudes of vibration components, the frequency being continuously varied over the range of interest. A number of such charts are obtained, each corresponding to a given condition, say constant revolutions per minute, of the vibration producing agency. There is obviously the possibility that some critical rotation speed may be missed or imperfectly investigated.

The present invention avoids this risk by making possible the measurement of vibration components having frequencies related in any desired ratio to the instantaneous speed as this is varied continuously between limits separated as widely as the investigator desires. The resulting chart shows, with instantaneous speeds as abscissae, a number of curves for each of which the ordinates represent the successive amplitudes of a vibration component of which the frequency varies with speed but is always simply related thereto. For an airplane engine, for example, one such curve will exhibit the amplitude of the 5-cycle component at 300 revolutions per minute, of the 50-cycle component at 3,000 revolutions per minute and similarly at any intermediate speed, the amplitude of the vibration component whose frequency is that of the engine revolutions per second. This frequency may be termed the fundamental. Other curves on the same chart will represent, for continuously varied engine speed, vibration components having frequencies which are any desired multiples or submultiples of the corresponding fundamental.

The general object of the present invention is, therefore, to facilitate the making of vibration analyses and particularly to make unnecessary the usual restriction to an unchanged condition of the vibration producing agency during the analysis.

It will later be shown that the novel form of chart above described may by replotting be transformed into a series of vibration amplitude versus frequency curves of the usual type. Therefore, another object of the invention is to provide means for making a novel form of vibration analysis resulting in a chart record from which by replotting there may be obtained an amplitude versus frequency analysis of the conventional form.

Moreover, a complete vibration analysis made as will be described requires only a single operator and only a fraction of the time now taken for an equally thorough investigation in the usual fashion. Accordingly, it is another object of the invention to effect a great economy of time and effort in vibration analysis.

The assembly of apparatus which will be described as a preferred embodiment of the invention includes a number of known electrical and mechanical devices, among them electrical analyzing apparatus for isolating vibration components and measuring their amplitudes, means for measuring rotational speed of an engine producing the vibration to be analyzed and means for driving a recording chart. The invention resides in the novel cooperation of such means and includes as a prominent feature the provision of what may be termed an electrical gearing which automatically controls simultaneously the tuning of the electrical analyzer and the position of the recording chart in correspondence with the varying engine speed.

The invention will be understood from the following description read with reference to the accompanying drawings in which:

Fig. 2 also illustrates how conventional curves may be obtained by replotting from Fig. 2 (a).

Figure 1:
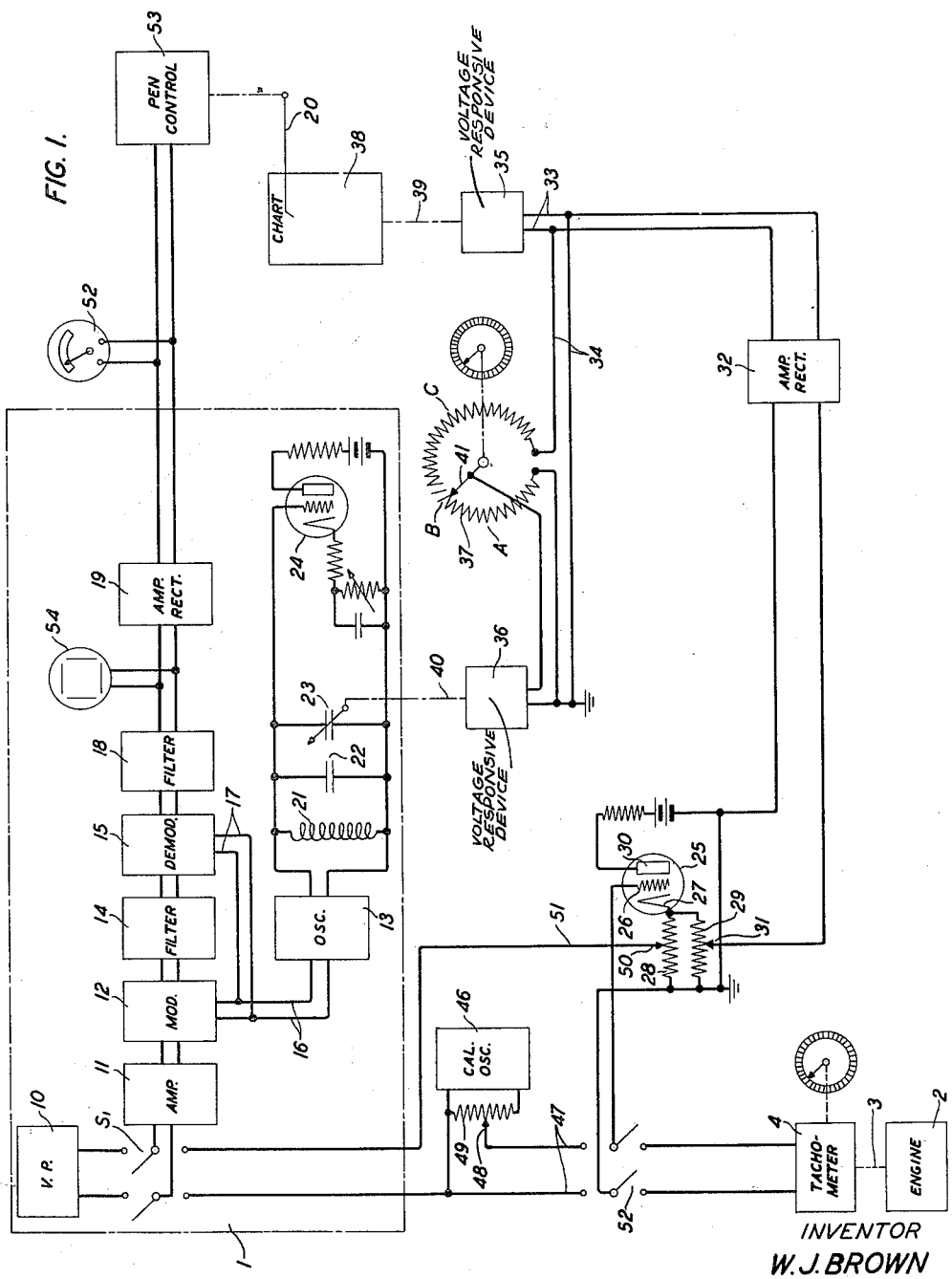
Fig. 1 is a schematic diagram of the apparatus of the invention.

Referring to Fig. 1, the dashed outline indicated by numeral 1 encloses the electrical analyzing circuit. This circuit includes vibration pick-up 10 which may be of any known form whereby mechanical vibrations are translated into complex electrical waves. Switch S1 in the upper position connects the output of pick-up 10 to amplifier 11 by which the various components of the electrical wave from the vibration pick-up are amplified and transmitted to balanced modulator 12 wherein these amplified components modulate the output of oscillator 13. Following modulator 12 is filter 14 which passes a narrow band of frequencies centered at a frequency high compared to the vibration components it is desired to measure. As a specific example, filter 14 is a crystal filter passing a band of frequencies 4 cycles per second wide centered at 92 kilocycles per second. If now oscillator 13 is tuned to 92,050 cycles per second, the 50-cycle component of the output wave of amplifier 11 produces a lower side-band of 92 kilocycles which is passed by filter 14 to be applied to demodulator 15. As shown in Fig. 1, conductors 16 supply to modulator 12 the output of oscillator 13 and this output is likewise supplied, by conductors 17, to demodulator 15 whereby under the conditions stated the 50-cycle per second vibration component is regained and further filtered by low-pass filter 18 to suppress traces of the oscillator voltage which may have survived cancellation in modulator 12 and demodulator 15. It is to be understood that power supplies (not shown) are available for amplifier 11, modulator 12, oscillator 13, and demodulator 15; likewise, for rectifiers 19 and 32 and oscillator 46 later described. Further, potentiometers (not shown) may be used to control the oscillator voltage supplied over conductors 16 and 17, respectively. The operation of the analyzing circuit briefly outlined above is set forth fully in United States Patent 1,976,481, October 9, 1934, to T. G. Castner.

The 50-cycle per second component purified by filter 18 is rectified by amplifier-rectifier 19, an apparatus which is described in detail in United States Patent 2,147,729, February 21, 1939, to A. V. Wurmser. The output of rectifier 19 is a direct current representative under the conditions named of the amplitude of the 50-cycle per second component present in the original complex wave to which pick-up 10 is subjected. This output current is used to control in a known manner recording pen 20. Pen 20 and pen control 53 are suitably adaptations of the amplitude recording mechanism disclosed by E. C. Wente in United States Patent 2,003,913, June 4, 1935.

If the pick-up and analyzer which have been described are used in the study of vibration of airplane surfaces, it is found that a frequency range of 5 to 500 cycles per second is adequate for the vibration analysis. The corresponding range of tuning of oscillator 13 is then from 92,005 to 92,500 cycles per second, a variation of one-half of one per cent of the mean frequency. The tuning circuit of oscillator 13 comprises a fixed inductance 21 in parallel with fixed capacitor 22, variable capacitor 23 and vacuum tube 24. Tube 24 serves as a trimming capacitor, its input capacity being varied by varying the tube conductance as described in United States Patent 2,088,439, July 27, 1937, to H. Rothe. The capacitor 23 is a straight line variable condenser, which for the frequency range above indicated, is variable, say from 7 to 36 micromicrofarads, a variation which is 1 per cent of the 2,900 micromicrofarads of capacitor 22. If the capacitance of the tuning circuit varies linearly with angular rotation of the movable plate of condenser 23, the tuning frequency will vary not strictly linearly with such rotation but nearly enough so over the small percentage variation required.

The problem solved by the invention is that of causing recording chart position and the tuning of oscillator 13 to vary linearly and simultaneously with the rotational speed of the engine producing the vibrations to be analyzed.

Engine 2 is geared, for example, by flexible shaft 3 to drive tachometer 4 which is suitably a Westinghouse A-80 tachometer developing an alternating voltage of which both frequency and amplitude are proportional to engine speed. This alternating voltage is applied, when switch S2 is closed downward, to the input circuit of vacuum tube 25, namely, between control grid 26 of tube 25 and ground. Cathode 27 is connected to ground through two potentiometers 28 and 29 in parallel. Anode 30 of tube 25 is supplied with anode voltage in the usual manner. Cathode 27 may be heated by any known means, not shown.

The described circuit of tube 25 is the well-known cathode follower circuit, used here in order that tachometer 4 shall face a high impedance load while an output load of low impedance may be connected between ground and tap 31 on potentiometer 29. With this arrangement an alternating voltage proportional in frequency and amplitude to engine speed is available between ground and tap 31 and is supplied to the input of amplifier-rectifier 32 which is similar to rectifier 19. The output rectifier 32 is applied over parallel paths 33 and 34 to devices 35 and 36, respectively, potentiometer 37 being included in the output path leading to device 36 in order that the voltage thereto supplied may be controlled by the operator as later described.

Devices 35 and 36 may in their simplest form be oversized meter movements, their respective shafts 39 and 40 controlling the angular positions of chart 38 and of the movable plate of condenser 23, respectively. Of course, more elaborate instruments than meter movements will be used in practice. Suitable shaft control means for devices 35 and 36 are the "Brown continuous balance systems" using self-balancing potentiometers as in the Brown potentiometer pyrometer manufactured by the Brown Instrument Company of Philadelphia, Pennsylvania.

Bearing in mind that the output voltage of rectifier 32 is representative of the voltage generated by tachometer 4 which is itself proportional to the engine speed, the reader will see that the output voltage of rectifier 32 applied to device 35 controls the position of chart 38 with respect to pen 20 as a linear function of engine speed. Chart 38 rotates with shaft 39 between an extreme left and an extreme right position as the engine speed, and so the voltage from rectifier 32, varies between extreme values at the will of the operator.

At the same time that device 35 operates to control the chart position, the tuning of oscillator 13 is controlled by the rotation of the movable plate of condenser 23 driven through shaft 40 by device 36. Device 36 is controlled by a selected fraction of the voltage output of rectifier 32, a fraction determined by the setting of tap 41 on potentiometer 37. It will be apparent that tap 41 may be set at, say, position B indicated on potentiometer 37 to provide a voltage supply to device 36 which varies with engine speed and has the value at each speed appropriate to tune oscillator 13 to the frequency which permits pen 20 to record the amplitude of the vibration component having the frequency of the engine revolutions per second, the frequency which has herein been termed the fundamental, at the instantaneous engine speed.

Furthermore, doubling the voltage fraction supplied to device 36 by setting tap 41 at C will cause the movable plate of condenser 23 to assume, say, at one extreme of the engine speed a position so tuning oscillator 13 that the frequency component selected by the analyzing circuit shall be twice the fundamental. In this case, the changes in voltage supplied to device 36 will be doubled for a given change of engine speed and the chart will record a new curve of which the ordinates are amplitudes of vibration components having for each point of the curve a frequency twice that of the fundamental corresponding to the instantaneous engine speed.

Frequencies half the corresponding fundamentals will be charted when tap 41 is at A and provides device 36 half the voltage provided when tap 41 is set at B. Clearly, any number of settings of potentiometer 37 may be predetermined whereby tap 41 may be made to select any desired multiple or submultiple of the voltage derived when tap 41 is at A and so control the tuning of oscillator 13 in accordance with the desired harmonic or subharmonic of the fundamental frequency at each engine speed.

It is to be understood that devices 35 and 36 are voltage responsive instruments of which the sensitivities may be independently adjusted as desired. Their operation under the control of the output voltage of rectifier 32 may be explained as follows:

The full voltage of rectifier 32 is applied over conductors 33 to device 35. The voltage delivered by rectifier 32 is proportional to engine speed and the angular position of chart 38 is a linear function of this voltage which may be, for example, 50 volts when the speed of engine 2 is 3,000 revolutions per minute, to which corresponds a fundamental frequency of 50 cycles per second. The sensitivity of device 35 is so chosen that a convenient range of chart positions is obtained for the range of engine speeds it is required to use. At the same time, by tap 41 of potentiometer 37 the voltage from rectifier 32 is fractionated as desired for the control of shaft 40 and so of the capacity of condenser 23 for the narrow range over which the frequency of oscillator 13 must vary. This frequency varies nearly enough linearly with the capacitance controlled by shaft 40. Obviously, by suitable shaping of the plates of condenser 23, this frequency variation may be made strictly linear with the rotation of shaft 40. The sensitivity of device 36 is so adjusted that the frequency generated by oscillator 13 shall be, for example, in cycles per second 92,000+10V, where V is the voltage picked off by tap 41.

If now V is 50 volts when the full voltage of rectifier 32 at the engine speed of 3,000 revolutions per minute is applied to device 36, oscillator 13 will generate the frequency of 92,500 cycles per second. This generated frequency decreases linearly to 92,000 as the applied voltage decreases to zero for the engine at rest. Under these circumstances, the oscillator frequency varies from 92,050 to 92,500 as the engine speed varies from 300 to 3,000 revolutions per minute, chart 38 simultaneously turning between corresponding positions. These chart positions are not affected by varying the setting of tap 41. For the range of engine speeds assumed the fundamental frequency varies from 5 to 50 cycles per second. So with the full voltage of rectifier 32 applied to device 35, recording pen 20 traces a curve representing the vibration component which is the tenth harmonic of the engine fundamental frequency.

Setting now tap 41 at B one may apply to device 36 one-tenth the voltage of rectifier 32 with the result that the frequency of oscillator 13 varies from 92,005 to 92,050 cycles per second and the curve traced by pen 20 represents the vibration component of fundamental frequency. So for tap 41 at A, the oscillator frequency varies between 92,005 and 92,025 cycles per second. For tap 41 at C, the frequency range is from 92,010 to 92,100 cycles per second.

In practice, a score or more of predetermined settings of tap 41 are provided, each corresponding to the tracing of a curve which represents a frequency related in a particular ratio to the instantaneous engine revolutions per second as the engine speed is varied over the desired range. Each of the curves so obtained is appropriately labelled to identify the frequency ratio to which the curve relates. Therefore, if chart 38 has a rectangular shape, it will show engine speed as abscissae and for each speed a vertical line on the chart will intersect all of the curves traced by pen 20 as chart 38 moves under it. Predetermined settings of tap 41 are suitably chosen to select a frequency related to engine speed by the equation $f=kS/60$, where S is the instantaneous engine revolutions per minute and $k$ is determined by the setting of tap 41. In practice, $k$ varies from 0.4 to 10 by finite but narrow steps. When $k$ is 0.4 and S varies from 300 to 3,000 revolutions per minute, pen 20 traces a curve of which the ordinates are proportional to the amplitudes of vibration components having for each speed a frequency four-tenths the corresponding engine revolutions per second, that is, from 2 cycles per second for 300 revolutions per minute to 20 cycles per second when the revolutions are 3,000 per minute. When $k=10$, the components evaluated have frequencies ranging from 50 to 500 cycles per second over the engine speed range mentioned.

It will be apparent that by replotting the intersections of any vertical line on chart 38 with the curves thereon, one obtains a score or more of vibration amplitudes corresponding to different discrete frequencies at a given speed. The conventional form of chart of amplitude versus frequency is thereby derived except that the replotted curve is not continuous. However, any desired number of closely spaced frequencies may be represented and the conventional curve approached closely enough.

It remains to describe the method of calibrating the apparatus shown in Fig. 1 and the operating procedure in using it.

From the characteristics of tachometer 4 it is known what voltage that instrument will deliver to the input circuit of tube 25 for an engine speed of 3,000 revolutions per minute, the engine's fundamental frequency being then 50 cycles per second. Let now switches S1 and S2 be thrown, S1 downward and S2 upward. Let calibrating oscillator 46, of any convenient design, be tuned to 50 cycles and deliver over conductors 47 through switch S2, now thrown upward, to the input circuit of tube 25 a 50-cycle voltage from oscillator 46 equal to the tachometer output voltage for 3,000 engine revolutions per minute. A detailed description of oscillator 46 and its power supply (not shown) is unnecessary. Adjustable tap 48 on potentiometer 49 shunted across the output of oscillator 46 enables the operator to establish the desired voltage between ground and control grid 26 of tube 25. There results a 50-cycle voltage across the cathode followers, namely, potentiometers 28 and 29, and by adjusting tap 31 on the latter potentiometer the voltage output of rectifier 32 is brought to the proper value to cause device 35 to position chart 38, as described, under recording pen 20.

At the same time tap 50 on potentiometer 28 is connected through conductor 51 to one contact on the new position of switch S1; the other contact of S1 in this position is connected to the grounded one of conductors 47. Thereby a 50-cycle voltage of suitable magnitude is applied to the input of amplifier 11 replacing vibration pick-up 10. It is now required to tune oscillator 13 to 92,050 cycles in order that 50 cycles may be transmitted to control pen 20. This tuning is accomplished by setting tap 41 on potentiometer 37 for a maximum reading of meter 52 connected in parallel with the input to pen control 53. Either tap 41 alone may be adjusted to this end thereby locating potentiometer step B above mentioned, or, if more convenient, step B may be arbitrarily chosen and an adjustment made of the movable plate of condenser 23 relative to shaft 40. For the most refined tuning the conductance of tube 24 may be varied, as previously indicated. In addition to meter 52 cathode ray oscilloscope 54 conventionally connected in parallel with the input to rectifier 19 may be used to observe visually the output of filter 18.

In the calibrating procedure just described chart 38 assumes a position corresponding to an engine speed of 3,000 revolutions per minute and simultaneously oscillator 13 assumes a tuning corresponding to the recording of a 50-cycle component, the fundamental at this engine speed. Thereafter switches S1 and S2 are returned to their operating positions, whereby pick-up 10 is reconnected to amplifier 11 and the output of tachometer 4 is again applied to tube 25. Variations in engine speed will now be accompanied by simultaneous changes in oscillator tuning and in chart position. The variation in chart position and in the capacitance of condenser 23 will be strictly linear with engine speed, while the variation in oscillator tuning will be substantially so, since for an analyzed frequency range from 5 to 500 cycles per second the total capacitance of condensers 22 and 23 varies only one per cent.

Figure 2:
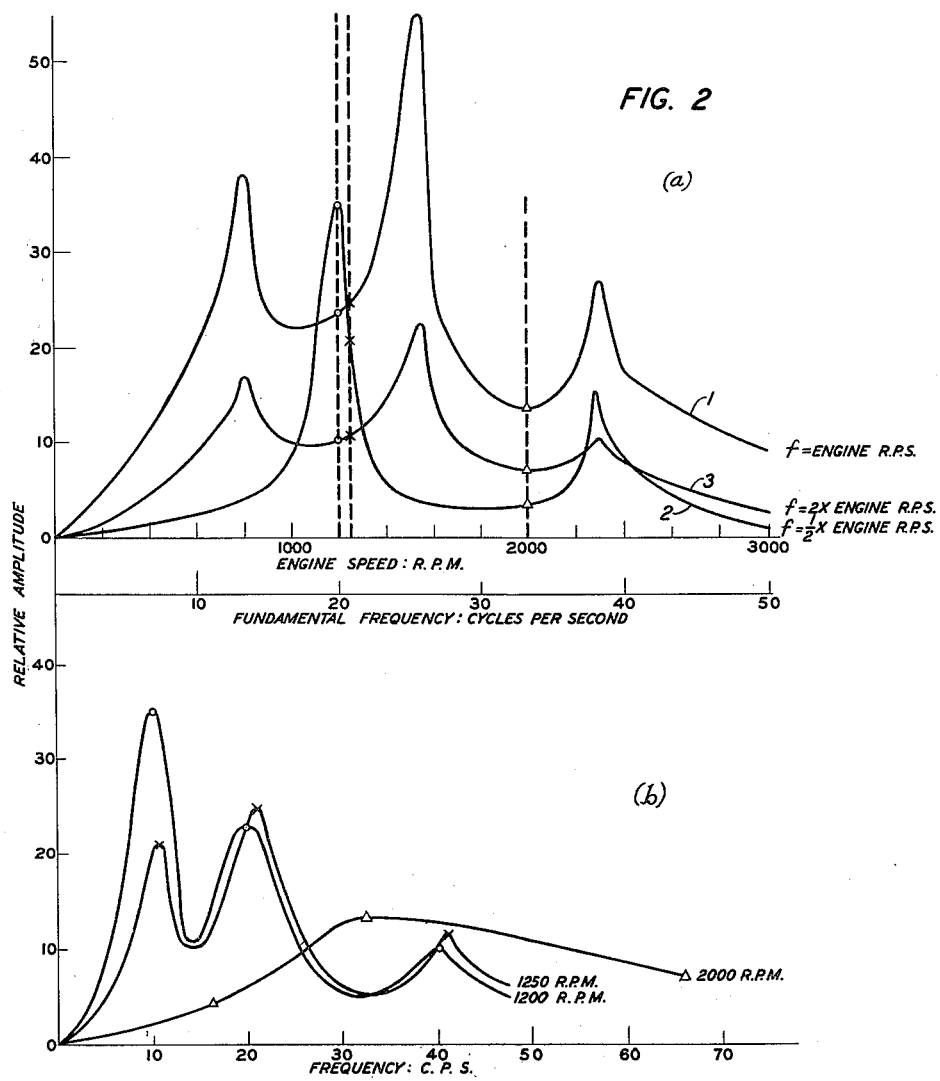
Fig. 2 shows at (a) an example of the novel form of chart to be obtained by the apparatus of Fig. 1 and for comparison shows at (b) the conventional chart.

Fig. 2 shows at (a) the novel form of chart record produced by the apparatus of Fig. 1. A rectangular chart is here shown which is obviously replaceable by a circular chart, if desired. Abscissae are engine speeds in revolutions per minute, while the ordinates of curve 1 are amplitudes of the vibration components of frequencies equal to the engine's revolutions per second as the engine speed varies. Curve 1, therefore, results from setting tap 41 at B on potentiometer 37. Curve 2 shows the amplitudes of vibration components of frequencies one-half the engine's revolutions per second, tap 41 being set at A; while curve 3 represents vibration components having for each speed a frequency twice the engine's revolutions per second. In this case tap 41 is at C.

For comparison, the conventional form of chart where abscissae are frequencies and ordinates are amplitudes is shown at (b) in Fig. 2. Through the curves in (a) are drawn dashed ordinates at engine speeds of 1,200, 1,250 and 2,000 revolutions per minute. These ordinates intersect curves 1, 2 and 3 at points marked with circles, crosses and triangles, respectively, the circles representing at 1,200 revolutions per minute the amplitudes of vibration components of the frequency of 10, 20 and 40 cycles per second. Similarly, the crosses and triangles furnish points of the curves for 1,250 and 2,000 revolutions per minute, respectively. By making a large enough number of curves such as those shown in Fig. 2 (a) the continuous curves of the convention analysis may be approached as closely as desired. In practice, when a large number of amplitude verses speed curves is required, these would be distributed among several charts to avoid confusion due to overlapping.

The procedure in using the apparatus of the present invention is simple. When an airplane is in flight with vibration pick-up 10 affixed to a surface of which the vibrations are to be analyzed, tap 41 is under the pilot's control. This tap may be referred to as the curve selector, inasmuch as its setting on potentiometer 44 determines which of the curves shown at (a) in Fig. 2 shall be traced on the recording chart. Setting the curve selector, say to position B, the pilot sweeps the engine's speed from maximum to minimum, or vice versa, traversing this speed range as rapidly as he desires consistently with respect for the engine and for the inertia of the responding elements of the analyzer. Then he resets the selector, say to position C, and sweeps back over this speed range. Thus, by alternately opening and closing the throttle and resetting each time tap 41, any number of curves such as those at (a) in Fig. 2 are automatically obtained. The pilot requires no collaborator to manage the analyzer and the complete analysis is obtained in a matter of minutes with no requirement of constant engine speed.

From the foregoing description it will be clear that the invention provides means to obtain the novel form of vibration analysis chart described where engine speed is varied between any desired limits. The description given refers particularly to the application of the invention to the analysis of vibrations due to an airplane engine, but the application of other uses is obvious. Turbines, to name one example, start from rest and ultimately attain rotational speeds of the order of 1,000 revolutions per second, passing perhaps through intermediate critical speeds which the present invention is especially adapted to investigate. It will be understood that the mean tuning of oscillator 13 and the frequency of transmission of filter 14 will be chosen to suit the circumstances of the test. There is likewise no limit on the range of frequencies which may be covered in the analysis, it being only requisite that the frequencies passed by filter 14 and generated by oscillator 13 be high compared with the frequency range of the vibration components to be analyzed.

Since the invention resides in the novel mode of cooperation of its apparatus components, equivalents for each of the elements specifically described may be substituted therefor without departing from the spirit of the invention. Moreover, it will be observed that the invention is not limited to the described application in which it is desirable that the analyzer tuning and the chart position be simultaneously controlled by a voltage varying linearly with engine speed and that responses of both chart and analyzer be linear with the controlling voltage. In general, the controlling voltage may vary as any desired function of a condition which, if varied, causes variation in the vibration it is required to analyze, and the voltage input to devices 35 and 36 may vary independently as any desired functions of the controlling voltage.

What is claimed is:

1. Means for analyzing mechanical vibrations as functions of the rotational speed of a vibration producing agency comprising means for translating said vibrations into electrical waves, means for isolating frequency components of said waves, means for measuring the magnitudes of said components, means including a positionable chart for recording said magnitudes, means for deriving a voltage varying with said rotational speed and means for controlling simultaneously the frequency of the component isolated by said isolating means and the position of said chart in accordance with said voltage.

2. Means for analyzing mechanical vibrations as functions of the rotational speed of a vibration producing agency comprising means for translating said vibrations into electrical waves, electrical means for analyzing said waves including a generator of electrical oscillations of variable frequency, means for recording the amplitudes of the components of said waves including a recording chart, means for positioning said chart, means for varying the frequency of said oscillations, speed indicating means associated with said agency and electrical means associated with said speed indicating means for controlling simultaneously said positioning means and said frequency varying means in correspondence with said rotational speed.

3. Means for analyzing a complex vibration with respect to a variable vibration producing condition, including means for deriving a voltage representative of said variable condition, means for generating an electrical current representative of said vibration, means for isolating frequency components of said current, means for measuring the magnitudes of said components, means including a positionable chart for recording said magnitudes and means for controlling simultaneously the frequency of the component isolated by said isolating means and the position of said chart in accordance with said voltage.

4. For the analysis of vibrations produced by a rotating agency as functions of the rotational speed of said agency a system of apparatus comprising means for translating said vibrations into electrical waves, means for isolating frequency components of said waves, a first voltage responsive means for controlling the frequency of the component isolated by said isolating means, means for measuring the magnitudes of said components, means including a positionable chart for recording said magnitudes, a second voltage responsive means for controlling the position of said chart, means for deriving a voltage proportional to said rotational speed and means for subjecting said first and said second voltage responsive means simultaneously and independently to the control of said voltage.

5. Means for analyzing mechanical vibrations as functions of the rotational speed of a vibration producing agency comprising means for deriving a voltage proportional to said rotational speed, means for translating said vibrations into electrical waves, means for isolating frequency components of said waves, means for measuring the magnitudes of said components, means including a positionable chart for recording said magnitudes, means for controlling the position of said chart in accordance with said voltage and means for controlling the frequency of the component isolated by said isolating means in accordance with a desired fraction of said voltage.

6. In a vibration analyzer for the analysis of mechanical vibrations as functions of the rotational speed of a vibration producing agency, means for indicating said rotational speed, means for translating said vibrations into electrical waves, means for isolating frequency components of said waves and means controlled by said speed indicating means for varying the frequency of the component isolated by said isolating means in a selected ratio to said rotational speed.

7. Means for analyzing mechanical vibrations with reference to the rotational speed of a vibration producing agency comprising means for translating said vibrations into electrical waves, means for isolating frequency components of said waves, means for measuring the magnitudes of said components, means including a positionable chart for recording said magnitudes, speed indicating means associated with said agency including means for generating an alternating voltage proportional in frequency and amplitude to said rotational speed, means for rectifying said voltage, voltage responsive means for controlling the position of said chart in accordance with said rectified voltage, means including a variable potentiometer for selecting a desired fraction of said rectified voltage and voltage responsive means for controlling the frequency of the component isolated by said isolating means in accordance with said fractional voltage.

8. In a system of apparatus for the analysis of vibrations produced by a rotating agency operable at a variable rotational speed, speed responsive means associated with said agency for generating an alternating voltage proportional in frequency and amplitude to said rotational speed, a thermionic vacuum tube provided at least with a control grid, a cathode and an anode, said cathode being grounded through a variable resistance, circuit means for applying said voltage between said control grid and ground, circuit means for deriving from said resistance a second voltage proportional in frequency and amplitude to said rotational speed, means for rectifying said second voltage, means for translating said vibrations into electrical waves, means for isolating frequency components of said waves, means for measuring the magnitudes of said components, means including a positionable chart for recording said magnitudes, a first voltage responsive means for controlling the frequency of the component isolated by said isolating means, a second voltage responsive means for controlling the position of said chart, circuit means including a variable potentiometer for subjecting said first voltage responsive means to the control of a desired fraction of said second voltage and circuit means for subjecting said second voltage responsive means to the control of said second voltage.

9. In a vibration analyzer for the analysis of mechanical vibrations as functions of the rotational speed of a vibration producing agency, means for indicating said rotational speed, means for translating said vibrations into electrical waves, means for isolating frequency components of said waves and means controlled by said speed indicating means for varying the frequency of the component isolated by said isolating means in a selected ratio to said rotational speed including manually operable means for selecting said ratio.

WILLIAM J. BROWN.